United States Patent
Segal et al.

(10) Patent No.: US 10,558,505 B2
(45) Date of Patent: Feb. 11, 2020

(54) SYSTEM AND METHOD FOR IMPLEMENTING ENTERPRISE OPERATIONS MANAGEMENT TRIGGER EVENT HANDLING

(71) Applicant: Stemmons Enterprise LLC, Houston, TX (US)

(72) Inventors: Justin Rafael Segal, Houston, TX (US); William Earl Daugherty, III, Houston, TX (US)

(73) Assignee: Stemmons Enterprise, LLC, Houston, TX (US)

( * ) Notice: Subject to any disclaimer, the term of this patent is extended or adjusted under 35 U.S.C. 154(b) by 0 days.

(21) Appl. No.: 15/936,423

(22) Filed: Mar. 26, 2018

(65) Prior Publication Data

US 2018/0293116 A1  Oct. 11, 2018

Related U.S. Application Data

(60) Provisional application No. 62/476,667, filed on Mar. 24, 2017.

(51) Int. Cl.
*G06F 9/54* (2006.01)
*G06N 5/02* (2006.01)
*G06F 9/44* (2018.01)
*G06F 16/18* (2019.01)
*G06F 9/451* (2018.01)

(52) U.S. Cl.
CPC ............... *G06F 9/542* (2013.01); *G06F 9/44* (2013.01); *G06F 9/453* (2018.02); *G06F 9/548* (2013.01); *G06F 16/1805* (2019.01); *G06N 5/02* (2013.01)

(58) Field of Classification Search
None
See application file for complete search history.

(56) References Cited

U.S. PATENT DOCUMENTS

2017/0344921 A1*  11/2017  Leonelli

* cited by examiner

*Primary Examiner* — Syed A Roni
(74) *Attorney, Agent, or Firm* — Andrew P. Tower, Esq.

(57) ABSTRACT

System and methods are disclosed to facilitate the active management and allocation of the knowledge resources of an organization. In one exemplary implementation, the systems and methods include a trigger event handler module installed on a computing device, such as a computer server, configured to receive and process data that will fire trigger events in real time to modify records of the organization or perform processes and specified actions. The system collects data about the transaction and stores the data in a database for future use.

6 Claims, 5 Drawing Sheets

SYSTEM AND METHOD FOR IMPLEMENTING ENTERPRISE OPERATIONS MANAGEMENT TRIGGER EVENT HANDLING

CROSS-REFERENCE TO RELATED APPLICATIONS

This application claims priority to U.S. Provisional Patent Application Ser. No. 62/476,667, filed on Mar. 24, 2017.

BACKGROUND OF DISCLOSURE

Field of the Invention

The present invention relates generally to the field of enterprise operations and more particularly to techniques for managing and optimizing the knowledge resources of employees and organizations.

Description of the Related Art

Enterprise operations environments are dynamic and complex. They typically involve multiple parties and requires significant and timely communication and coordination. Numerous activities and decisions occur daily ranging from exception handling and management, resource configuration, as well as decisions based on collaboration and knowledge. In addition, the parties involved must adhere to numerous regulations and guidelines and be able to react in real-time.

Enterprise operations systems collect and manage the knowledge of a group of people, such as the employees of an organization. They are often implemented using software, computing devices and servers. For example, conventional knowledge management tools and systems include wikis, blogs, filing systems, and document management systems.

Enterprise operations systems are best implemented to maintain the knowledge of an organization while its employees and assets change over time. Effective enterprise operations systems will also retain and organize the knowledge of an organization so that new employees will be able to locate and use the knowledge of the organization and that knowledge will not be lost with the departure of existing employees.

Many conventional enterprise operations are dependent on users making a concerted effort to enter information timely and properly so that later users can find relevant information or be alerted to action items that need immediate attention. However, users often use conventional enterprise operations tools and systems inconsistently, so that the organization's knowledge is not captured timely, adequately or organized or preserved in a manner that makes the information easily accessible or verified or validated in the future.

SUMMARY OF THE INVENTION

There is a need for systems and methods that automate and actively capture and manage an organization's knowledge and execute processes to make enterprise operations systems and methods less dependent on individual users to perform, manage and update all aspects of the methods and systems.

The embodiments of the present invention facilitate the active management and allocation of the knowledge resources of an organization in conjunction with using the applications for a commercially available enterprise operations system such as Stemmons Central™. The embodiments of the present invention further provide a method and system for allowing actions for managing applications resources in an organization to be automatically triggered upon a specific event.

In a first exemplary embodiment, the system to facilitate the active management and allocation of the knowledge resources of an organization comprises a trigger event handler module that can be installed on a computing device, such as a computer server. The trigger event module can be configured to receive data that will fire trigger events in real time to modify records of the organization or perform processes and specified actions. The system collects data about the transaction and stores the data in a database for future use.

In a second exemplary embodiment, a computer-implemented method to facilitate the active management and allocation of the knowledge resources of an organization is described. The exemplary method comprises a trigger event manager software module receiving data that will fire trigger events in real time to modify records of the organization or perform processes and specified actions. The system collects data about the transaction and stores the data in a database for future use.

In a third exemplary embodiment, a computer-readable storage medium comprising instructions to facilitate the active management and allocation of the knowledge resources of an organization is described. The instructions on the computer-readable storage medium can control the operation of a trigger event manager software module receiving data that will fire trigger events in real time to modify records of the organization or perform processes and specified actions. The instructions can direct the system to collects data about the transaction and store the data in a database for future use.

These and other embodiments are described in the detailed description that follows and the associated drawings.

Enterprise Management System Framework

As mentioned, the embodiments of the present invention can be implemented with an enterprise operations system software, such as Stemmons Central™ enterprise operations software. Stemmons Central™ will be discussed in more detail to orient the reader to a type of enterprise operations management system framework which may be used in conjunction with exemplary embodiments of the present invention.

Built on the Microsoft® Stack on an open-source server-side web application ASP.NET using structured query language (SQL), Stemmons Central™ integrates with third party applications, systems of record, legacy systems, and targeted applications, to bring disparate company data into one enterprise operations platform. Stemmons Central™ uses application programming interfaces (APIs) to move information throughout a client's business enterprise. Information flow may be from person to person or to a non-human actor—a bot, feature, service, application, algorithm, Robotic Process Automation (RPA) method.

Integrations for the Stemmons Central™ platform presently take one of the following forms: Application provides metadata or information to Stemmons Central™; Application consumes metadata or information from Stemmons Central™; Application triggers functionality in Stemmons Central™ Core Applications; Application uses Stemmons Central™ for login functionality, security, and presentation layer; and Application receives commands from Stemmons Central™.

The Stemmons Central™ system consists of three different layers: Visualization, Functionality and Data Integration.

The Visualization Layer acts as a unified presentation layer for the platform, third-party systems, and other applications. As a visualization layer, the platform handles: presentation of information from multiple systems; single sign-on; and interaction with various systems. The platform provides visualization in the following formats: HTML, SharePoint® and Mobile Applications. The Functionality Layer provides a set of core tools for common activities occurring throughout an organization. Stemmons Central's™ core applications presently include: Cases, Entities, Departments, Standards, and Quest. The Data Integration Layer integrates data from any existing system(s) into the system and creates a clearinghouse for enterprise data available to varied systems and users.

The generic nature of the Stemmons Central's™ core tools/applications allow the platform to be deployed across a wide range of departments, processes, and activities. The system includes an interface to the system for the users, the interface being provided by the processor and permitting the users to view and modify the configurational hierarchies. Each user has access to one or more of the hierarchies, and each user can have different access permissions in different hierarchies.

Stemmons Central's™ core tools/applications for managing common activities occurring throughout an organization will now be discussed in more detail.

Cases

Cases is a universal task management, project tracker, and collaboration tool used to provide normalized information for people and systems. It includes creating tasks, projects, to-do lists, tickets, requests, status lists and other similar transactions of any size or duration. As with each of its core applications, Stemmons Central™ includes a configuration tool that allows users to set up and administer the Cases application, without the need for programming. Administrators and users can set up Case types, create constraints on information, determine security, and control how the information is displayed. An exemplary application architecture for Cases, as illustrated in FIG. 1, includes multiple layers and components that work together to create a robust application. For integrating external applications or utilities, Cases uses the web service to communicate with the Data Access Layer, which in turn communicates with the database.

Entities

Entities is a Stemmons Central™ tool that manages lists of things (physical or conceptual) and makes those lists available to people and systems within an enterprise. Entities can be physical items (such as equipment, buildings, or computers), non-physical things (like customers, vendors, or divisions) or concepts (categories, stages, project types). For example, a "List of Properties" for a real estate management company may be managed in Entities via a "Properties Entity Type" with option to assign people to the Entity via a "Role." Building on that basic concept, Entities also allows for relationships between those things, and so, it can be thought of as a relational database that does not require programming. In addition, Entities provides a common set of tools that apply to any item tracked though the system, such as the ability to add images and documents, to associate people, or to provide an auditable change log. Entities can connect to other Stemmons Central™ systems, allowing the items it tracks to participate in various business processes.

The application architecture for Entities, similar to case includes multiple layers and components that work together to create a robust application. Entities works well with other Stemmons systems without the need for integration or programming, but its architecture is also designed to easily integrate with other systems through an API. For integrating external applications or utilities, use the Common API (a different instance of the same dynamic link library file (DLL) that talks directly to a Data Access Layer (as shown in FIG. 1) to communicate with the Entities web service, or, if indicated, to use the web service directly.) The Common API also translates the Data Types between the Web Service to the API's Common Data Types by performing a deep copy of the objects.

Departments

Stemmons Central's™ Departments application allows configurations of people/employee data in association with roles, assignments, permissions, participations, and other related information. Departments is highly integrated with Cases and Entities. This integration allows an organization to effectively manage all data aspects related to its people which assists in effective communications and improving productivity. To effectively manage all data relates to the employees/people, Departments tightly integrates with Cases, Entities, and Microsoft® Active Directory. It also allows loosely coupled integration with other Payroll/HR ERP Systems such as ADP®, Paycom®, etc. Once an employee is assigned to an Entity via a Role, the employee will be associated in the Role responsibility list for task assignment. As the employee is assigned to an Entity through a Role, the employee will be shown as an Assignee to any Cases associated to the Entity in Cases Application. This association will allow a user to determine who is responsible for the selected Entity for case assignment.

As a human resources (HR) user sets up a new employee through onboarding process through Departments, the Stemmons Central™ system will automatically create an Active Directory (AD) account. Changes in Departments will also be reflected in the Active Directory immediately. If HR terminates an employee in Departments Application, the system will deactivate the employee AD Account. Through an available service broker application, the system enables employee basic information from the Payroll system to be prorogated to Departments and AD Account.

Standards

Standards is a Stemmons Central™ online application that allows creation and sharing a wide range of knowledge-based documentations and how-to guides to the organization. Standards can be any types of documentation, how-to guides, policies, procedures, or description of anything people need to do.

Quest

Quest is a core Stemmons Central™ application that provides tools for surveys, inspections, checklists, and similar items. Quest is useful throughout an organization, addressing any situation with a list of questions, possible answers, scores, and resulting cases. Quest provides benefits beyond its basic scoring functionality, helping the organization maintain quality, identify opportunities for investment or intervention, and creating a system that is more easily teachable and scalable.

Visual Log

Visual Log gives an overview of cases activities starting from case creation to case closing. This log provides an overview of the case life including case due date, assigned users and the duration of the case with each user, change in case status, case priority, list of case owners and the ownership duration, and all the notes added by different users.

The foregoing is not intended to be an exhaustive discussion of the Stemmons Central™ system, but merely to orient the reader to the benefits of the present invention used in conjunction with similar software. Further information about Stemmons Central™ can be found in appropriate programming manuals, user guides, websites, and similar publications.

SUMMARY OF THE SOLUTION

Enterprise operations systems' core tools/applications, such as Stemmons Central's™ Entities, Cases, Quest, Departments, and Standards applications, in addition to being programmed and controlled by users, can be configured to consume triggers that can "kickoff" a workflow to actively and automatically perform certain action on a specific event. The trigger will pass the data object to a web service where the web service has the logic to handle certain process or workflow.

BRIEF DESCRIPTION OF THE FIGURES

The preferred embodiments of the present invention are illustrated by way of example and are not limited to the following figures.

DETAILED DESCRIPTION OF THE EXEMPLARY EMBODIMENTS

Although the exemplary embodiments will be generally described in the context of software modules running in a distributed computing environment, those skilled in the art will recognize that the present invention also can be implemented in conjunction with other program modules in a variety of other types of distributed or stand-alone computing environments. For example, in different distributed computing environments, program modules may be physically located in different local and remote memory storage devices. Execution of the program modules may occur locally in a stand-alone manner or remotely in a client/server manner. Examples of distributed computing environments include local area networks of an office, enterprise-wide computer networks, and the global Internet.

The detailed description that follows is represented largely in terms of processes and symbolic representations of operations in a computing environment by conventional computer components, which can include database servers, application servers, mail servers, routers, security devices, firewalls, clients, workstations, memory storage devices, display devices and input devices. Each of these conventional distributed computing components is accessible via a communications network, such as a wide area network or local area network.

The invention comprises computer programs that embody the functions described herein and that are illustrated in the appended flow charts. However, it should be apparent that there could be many different ways of implementing the invention in computer programming, and the invention should not be construed as limited to any one set of computer program instructions. Further, a skilled programmer would be able to write such a computer program to implement an exemplary embodiment based on the flow charts and associated description in the application text. Therefore, disclosure of a particular set of program code instructions is not considered necessary for an adequate understanding of how to make and use the invention. The inventive functionality of the claimed computer program will be explained in more detail in the following description read in conjunction with the figures illustrating the program flow.

Turning to the figures, in which like numerals indicate like elements throughout the figures, exemplary embodiments of the invention are described in detail.

Figure 1:
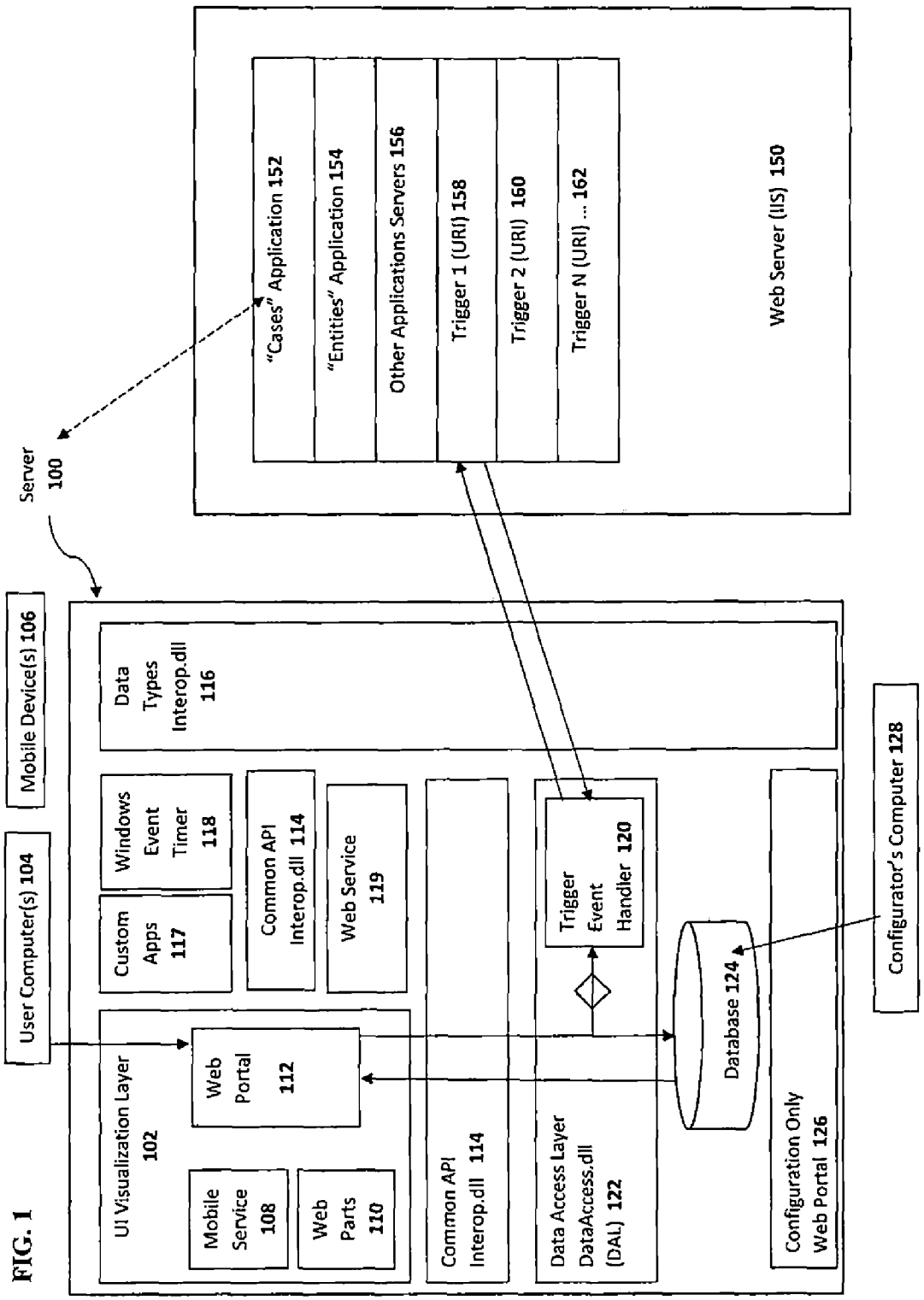
FIG. 1 illustrates an exemplary architecture for the components to facilitate the active management and allocation of the knowledge resources of an organization in accordance with an exemplary embodiment of the present invention.

Referring to FIG. 1, aspects of an exemplary computing environment for Stemmons Central™ is illustrated in which a system for actively managing the knowledge of an organization operates. Those skilled in the art will appreciate that FIG. 1 and the associated discussion are intended to provide a brief, general description of the preferred computer hardware and software program modules, and that additional information is readily available in the appropriate programming manuals, user guides, and similar publications.

FIG. 1 illustrates an exemplary trigger event handler module 120 installed on a server 100. The server 100 is an exploded illustration of a "Cases" application 152 server that may be part of a web server 150, such as an Internet Information Services (IIS) for Windows® server for hosting on the internet. The trigger event handler module 120 is part of the data access layer 122 of the server 100. Server 100 also comprises a user interface (UI) visualization layer 102, and a data layer or database(s) 124. The visualization layer 102 can comprise various software modules (such as a mobile service 108, ASP.Net web parts 110, or a web portal 112) used to communicate with and display information on for example user computers 104 or mobile devices 106. The data access layer 122 further comprises software modules used to retrieve data from and store data in the database 124. The software modules of the data access layer 122 also can provide data to and receive data from the trigger event handler module 120 and the web server 150. In the exemplary embodiment shown in FIG. 1, the server 120 may also comprise a common API module 114, which can be bundled with any ancillary executable application. The common API module 114 can be called as if it is part of the same stack as the rest of the application, so long as a Web Service URI (the default path), a path to the core system, or a direct connection string to the source database is provided. The same Common API 114 (same.DLL file) is also used by the core system behind the web service 119 to write back and forth to the data access layer 122. The server also comprises a data types interop assembly 116, custom applications 117, Windows event timer 118, and a RESTful web service module 119. As those skilled in the art will recognize, Representational State Transfer (REST) is a communications style that allows a client machine, for example a computer running a Web browser, to communicate to a server, for example a computer running a service. Client-server communication is "stateless" between requests, meaning each REST interaction typically contains the information for a component to understand the message. In the REST style, a data object is uniquely named using a Uniform Resource Identifier (URI).

The exemplary system illustrated in FIG. 1 also comprises a configuration only web portal 126 to facilitate access through a configurator's computer 128. Those of ordinary skill in the art will recognize that these modules and tools can be implemented in a variety of different software module configurations and a variety of computer environments.

In addition to the "Cases" application 152, the exemplary web server 150 may have modules installed for other applications 156, including an "Entities" application, as well as universal resource identifiers (URIs) for various triggers 1 through N (158, 160, 162)

As shown in the exemplary system illustrated in FIG. 1, trigger event handler module 120 can access one or more triggers (158, 160, 162) through the data access layer 122. The trigger event handler module 120 comprises software modules that can receive and analyze real time data to determine whether a trigger event has occurred. An administrator or other user can use a computer 128 through a configuration web portal 126 to set triggers in the database 124.

FIG. 1 includes conventional computing devices suitable for supporting the operation of the preferred embodiments of the present invention. The computing devices may operate in a networked environment with logical connections to one or more remote computers. The logical connections between computing devices may be represented by a local area network and a wide area network. Those of ordinary skill in the art will recognize that in this client/server configuration, the remote computer may function as a file server or computer server. Those of ordinary skill in the art also will recognize that the invention can function in a stand-alone computing environment.

The computing devices represented in FIG. 1 include one or more processing units, such as microprocessors manufactured by Intel Corporation of Santa Clara, Calif. The computing devices also include system memory, including read only memory (ROM) and random-access memory (RAM), which are connected to the processing units. Those skilled in the art will also appreciate that the present invention may be implemented on computers having other architectures, operating systems, and those that utilize other microprocessors. Users may enter commands and information into the computing devices by using input devices, such as a keyboards and/or pointing devices, such as a mouse. One or more monitors or other kind of display devices is connected to the computing devices. Although other internal components of the computing devices and servers are not shown in the Figures, those of ordinary skill in the art will appreciate that such components and the interconnection between them are well known. Accordingly, additional details concerning the internal construction of the computing devices need not be disclosed in connection with the present invention.

Figure 2:
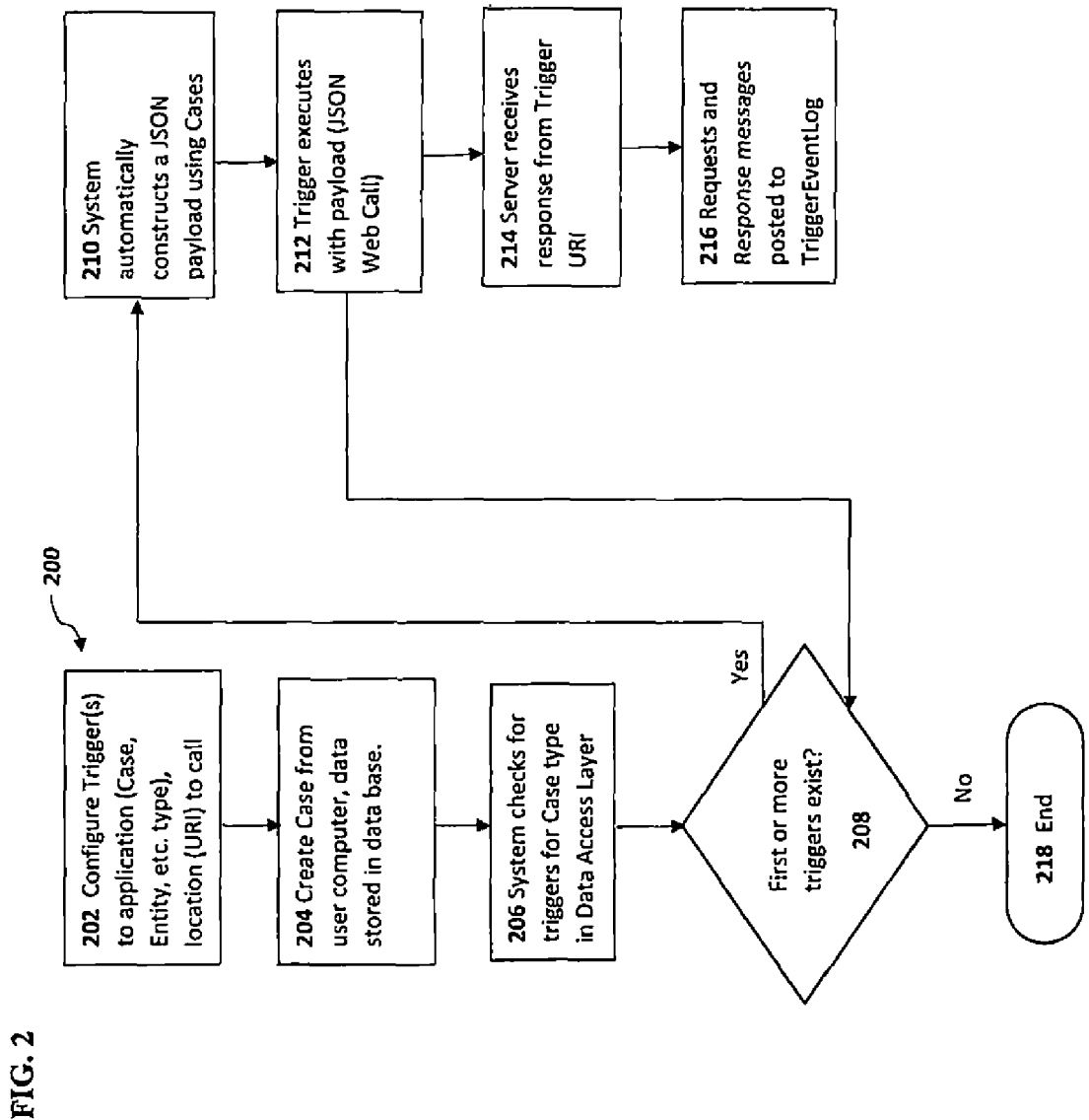
FIG. 2 illustrates a method to facilitate the active management and allocation of the knowledge resources of an organization in accordance with an exemplary embodiment of the present invention.

Referring to FIG. 2, an exemplary method 200 for automating and actively managing an enterprise's knowledge and executing processes is illustrated. Those of skill in the art will recognize that exemplary method 200 and the following discussion are merely one embodiment of the invention. In alternate embodiments of the invention, certain steps of method 200 may be performed in a different sequence, performed in parallel, or eliminated altogether. Furthermore, in alternate embodiments of the invention other software modules operating on local or remote computing devices may perform the steps of exemplary method 200.

Turning now to step 202, a configurator's computer 128 is used to configure one or more triggers including the location (URI) to call which is stored on the database 124. For the "cases: application in the exemplary embodiment represented in FIG. 2, the person configuring the system will build a configuration table called "TriggerEvent" with the following columns:
TriggerEventID
<system>TypeID (e.g., CaseTypeID, EntityTypeID, etc. . . . )
OnEvent
WebAPIUrl
WebAPIMode (e.g., Push, Post, etc. . . . )
CustomJSONString (e.g., Enough JSON to create a Case, or modify it, etc. . . . )
SendRawString (If 'Y' it will pass in the raw JSON source object such as the case, or the entity, etc. . . . )

When an "On-Event" happens in the respective system in FIG. 1, that system will query the configuration database 124 to see if there is an event that it should perform. The database 124 can store data for access by various components of the exemplary system shown in FIG. 1. In step 204 of exemplary process 200, the user computer 104, communicating through the web portal 112, is used to create a case, and data concerning the case is stored in the database 124. Simultaneously with the creation of a Case, in step 206, the trigger event handler module 120 checks for triggers for the Case in the data access layer 122.

In step 208, the trigger event handler module 120 analyzes whether one or more triggers for the Case type exist to execute. If none exist, the process ends at step 218. If there are triggers, as illustrated in step 210, the trigger event handler module 120 constructs a CustomJSONString or other syntax payload using the information in the Case. JavaScript Object Notation (JSON) is a syntax for storing and exchanging data. As one with ordinary skill in the art will appreciate, JSON makes it possible to store JavaScript objects as text. Since the JSON format is text only, it can easily be sent to and from a server and used as a data format by any programming language. JSON received from the server can be converted into JavaScript objects, with no complicated parsing and translations.

In step 212, the system performing the execution will have the prepared JSON data and it will GET or POST it to the required WebAPIUrl location, as shown as 158 in FIG. 1. The source system will process the trigger by looking up that trigger in the respective case applications database. Once it does that, it will parse out the CustomJSONString case field. It will replace attributed case field strings such as %%UNIT%% (Unit Field System Code) with the actual selected System Code ID (or Name).

For example, if an administrator were to create a trigger for a Unit, and the On-Event is OnCreate for Entities, the system will create a new case specifying the Unit field to be a specific unit ID. In addition, the trigger configurator may specify that there would be additional case information.

During this process, a database table will track the JSON calls out, called TriggerEventLog, and it will post all Requests and Response messages to and from the JSON call out, including failures. Steps 214 through 216 involve capturing the response from the Trigger URI and posting the request and response messages to a TriggerEventLog located in the database 124 and accessible through the web portal 112.

Alternate embodiments of the invention may perform variations of steps in 200. However, by incorporating knowledge capture into executing the trigger, the present invention improves and automates conventional enterprise operations software management approaches. Furthermore, those skilled in the art will appreciate that method 200 illustrated in FIG. 2 is merely exemplary. For instance, in alternate embodiments of the invention, the software modules illustrated in FIG. 1 that perform the steps of method 200 can be consolidated into a single software module or can be split up into multiple sub-component software modules.

Figure 3:
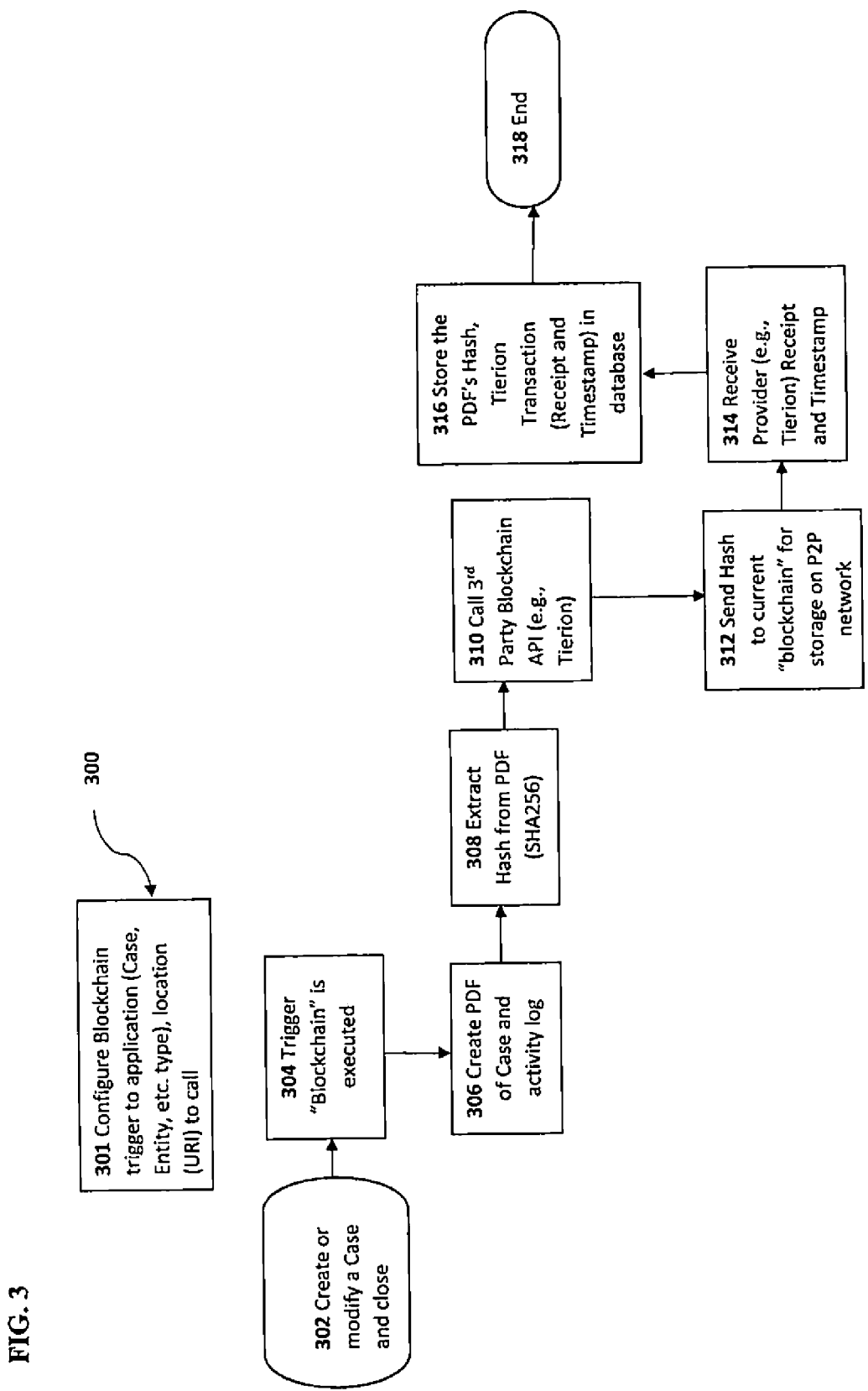
FIG. 3 illustrates a method of an exemplary process capable of being performed by the present invention of setting a trigger to automatically add case information to the "blockchain".
Figure 4:
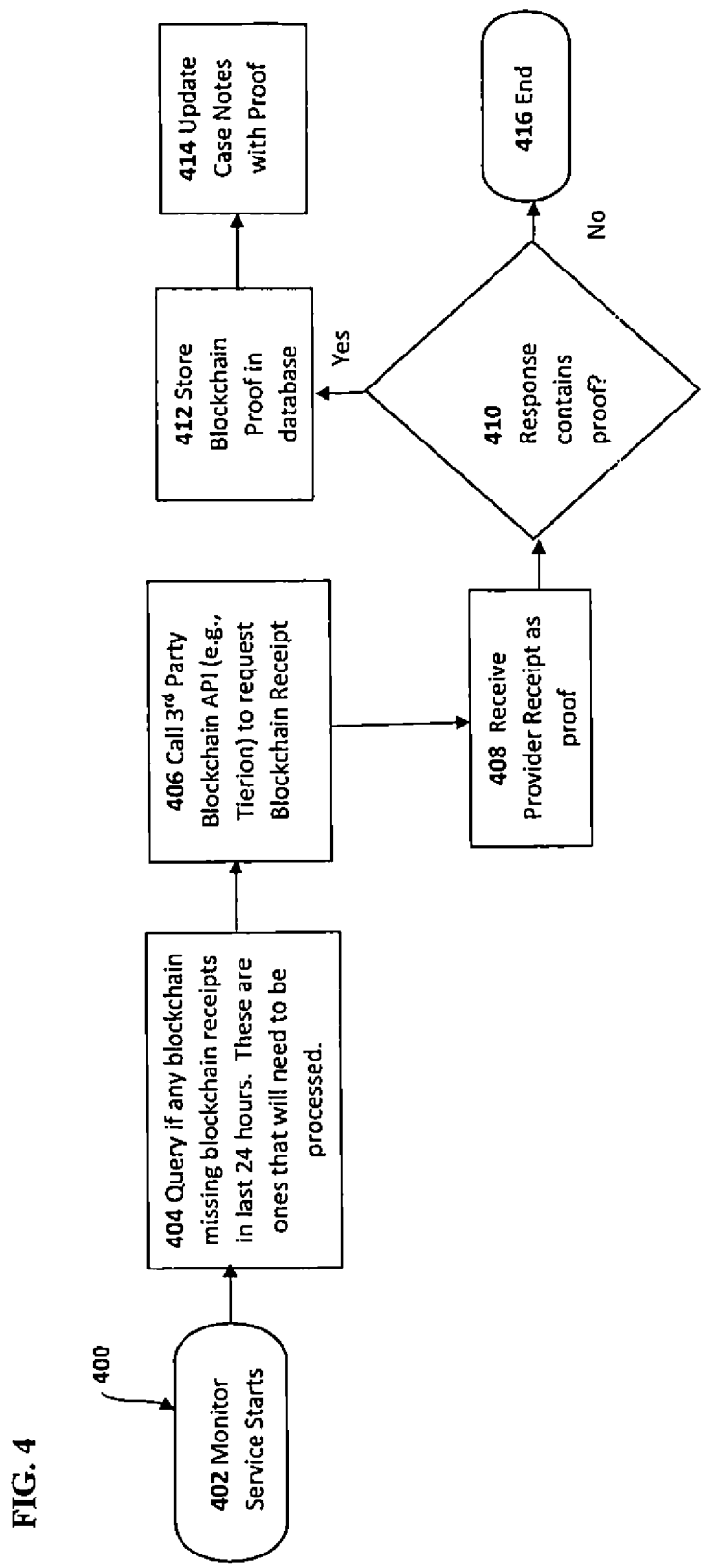
FIG. 4 illustrates a method of an exemplary process capable of being performed by the present invention of setting a trigger to monitor the receipt of case information added to the "blockchain".

An example of exemplary processes capable of being performed by the present invention of setting and monitoring a trigger is automatically adding Case information from an enterprise management system like Stemmons Central™ to the "blockchain" as is shown in FIGS. 3 and 4.

Blockchain technology is becoming of increasing importance and utility for recording and validating data. For example, with respect to Stemmons Central™ when creating a case, a trigger may be set to ensure that the case and edits made to it are time and date stamped. The blockchain feature triggered in cases helps a user to get the detailed status of a case by generating a portable document format file (PDF) that is validated using an algorithm known to those of ordinary skill in the art as Secure Hash Algorithm (SHA256). Secure Hash Algorithm is a cryptographic hash function that generates a unique fixed size 256-bit (32 Byte) hash for validating the API, and in return displays the following in notes section of a case: Provider Name, Provider Receipt, Provider Timestamp, Static Comments, PDF Snapshot, Validation URL & Blockchain Receipt (proof). In this way, an enterprise operations system like Stemmons Central™ may act as a general ledger for operations, validated by adding data objects like cases to the blockchain.

An exemplary method 300 for automating and actively managing an enterprise's knowledge and resource and executing processes in relation to the blockchain using the present invention is illustrated in FIG. 3.

Turning now to step 301, in a similar manner to the method as described in FIG. 2, a "blockchain" trigger is configured to record information on the "blockchain" is created and stored on the database 124. A case is at some point created or modified by a user in step 302 and closed. This activates the "blockchain" trigger, and the trigger event handler module 120 executes the trigger in step 304. In step 306, the system packages the case information into a PDF of everything that happened and an activity log of every event. Once the PDF is created it is written into the case and the trigger continues in step 308 by creating a 256-bit hash of that data through SHA256 from the PDF, which is also written into the case and then sent up to the staging blockchain and to a third party blockchain API (e.g. Tierion) in steps 310 and 312. The third-party blockchain provider gives a receipt and timestamp in step 314, which is also written into the case by the system, the information is packaged again, added to the bitcoin blockchain, and case receives a full bitcoin receipt in step 316.

Referring now to FIG. 4, and the exemplary method 400 of blockchain receipt validation according to the present invention, the system and a custom app 117 is configured to activate a monitoring service in step 402 to query in step 404 if there are any missing blockchain receipts over a time period, for instance, 24 hours. If there are missing receipts, the service will call the third party blockchain provider API (e.g. Tierion) in step 406 to request a blockchain receipt. If the provider is able to provide proof and the proof is validated after receipt in steps 408 and 410, respectively, the system will store the blockchain proof in step 412 in the database 124. The system will then add the proof to the case notes in step 414. If the response does not contain proof, the service will end in step 416, until it is periodically reactivated in step 402.

With the blockchain trigger of the present invention, events that happen in an organization implementing the present invention down to a very detailed level can be recorded on the blockchain as an immutable record that adds value to the organization. For example, if selling an office building, or other asset, an enterprise can transfer entire title history of everything that happened to the asset, including inspection results. The ability to create and update "digital versions" of blockchain records of the enterprise's assets' history improves their value. In addition, when personnel in an organization is aware that records are preserved for posterity through the blockchain it creates a culture of accountability that is also extremely valuable.

The foregoing components and instances of the present invention are merely examples. Other embodiments of trigger event handler module 120 may include different features and may comprise different software modules organized in different designs. Furthermore, although the trigger event handler module 120 is shown installed on server 100, in alternate embodiments it may be installed in other computing environments.

Figure 5:
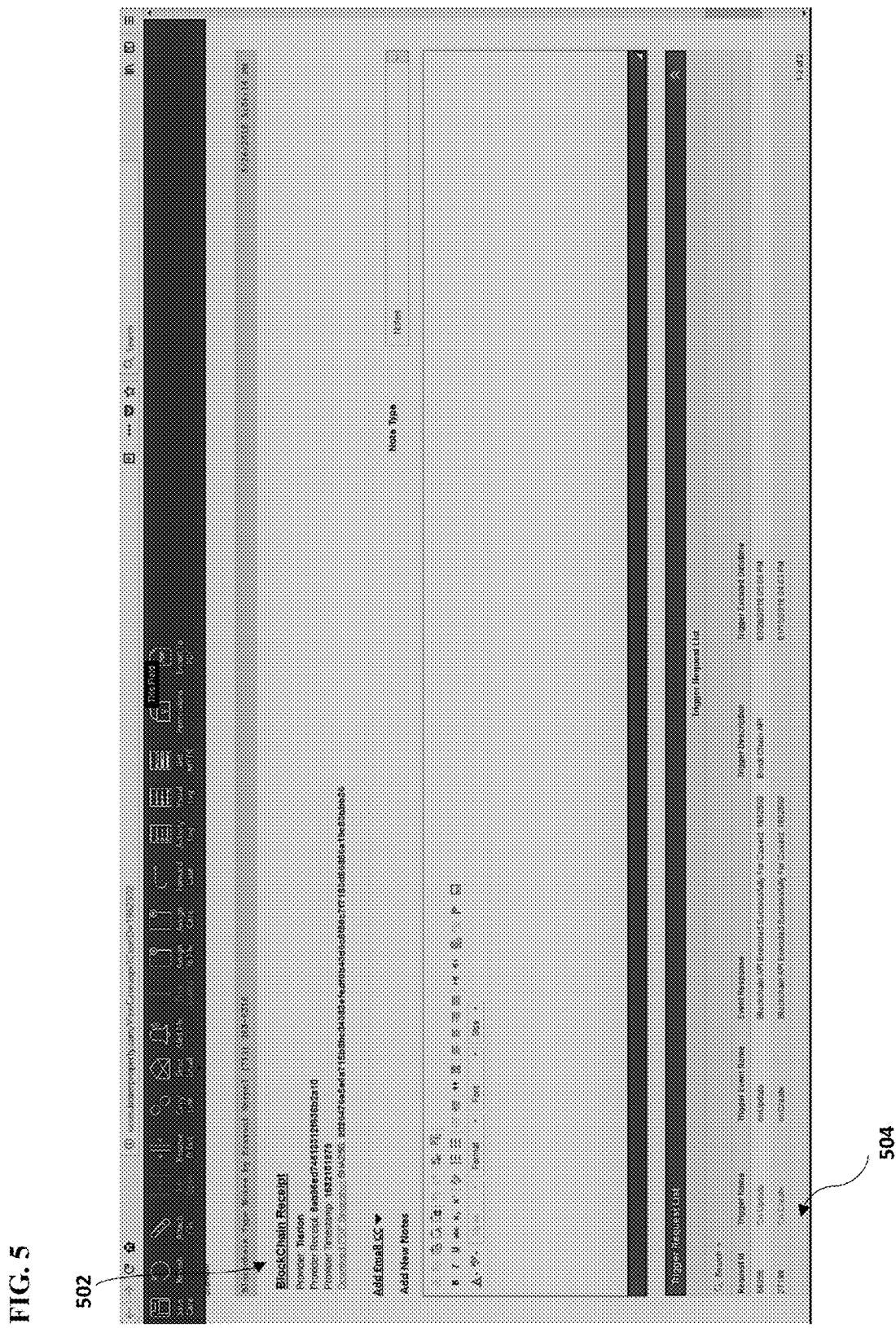
FIG. 5 illustrates an exemplary screen display showing certain features of the blockchain receipt validation in accordance with exemplary embodiments of the present invention.

FIG. 5 shows an exemplary screen display associated with the blockchain receipt validation flow in FIG. 4 is illustrated. Element 502 shows a blockchain receipt as written into the notes in step 414 of FIG. 4. Element 504 shows a visual representation of the trigger request list associated with the blockchain trigger that approximates the information in the trigger event log.

The embodiments set forth herein are intended to be exemplary. From the description of the exemplary embodiments, equivalents of the elements shown herein and ways of constructing other embodiments of the invention will be apparent to ordinary practitioners of the art. While representative software modules are described as performing the methods of the invention, variations of these software modules can also be used to execute the invention. Many other modifications, features and embodiments of the invention will become evident to those of skill in the art. It should be appreciated, therefore, that many aspects of the invention were described above by way of example only and are not intended as required or essential elements of the invention unless explicitly stated otherwise, and that numerous changes can be made therein without departing from the spirit and scope of the invention.

What is claimed is:

1. An enterprise operations management computing system for managing and allocating knowledge resources comprising a memory coupled to a trigger event handler module and a processor which is configured to execute programmed instructions stored in the memory comprising:
   monitoring a plurality of data object types as they are stored in the memory for configuration for one or more pre-selected triggers associated with a data object type;
   identifying said one or more triggers based on comparing received data concerning a data object type with a configuration table for such data object type;
   constructing a syntax payload from data available in the data object type;
   executing said one or more triggers sequentially by sending the syntax payload via a web call to one or more universal resource identifiers (URIs) for said triggers;
   receiving a response from the trigger; and storing a record of the trigger response to said memory of said computing system.

2. The system of claim 1, wherein the syntax payload comprises a custom JavaScript Object Notation (JSON) string.

3. A non-transitory computer readable medium having stored thereon instructions for managing and allocating knowledge resources comprising machine executable code which when executed by at least one processor, causes the processor to perform steps comprising:
- monitoring a plurality of data object types as they are stored in said non-transitory computer readable medium for configuration for one or more pre-selected triggers associated with a data object type;
- identifying said one or more triggers based on comparing received data concerning a data object type with a configuration table for such data object type;
- constructing a syntax payload from data available in the data object type;
- executing said one or more triggers sequentially by sending the syntax payload via a web call to one or more universal resource identifiers (URIs) for said triggers;
- receiving a response from the trigger; and
- storing a record of the trigger response to said non-transitory computer readable medium.

4. The medium of claim 3, wherein the syntax payload comprises a custom JavaScript Object Notation (JSON) string.

5. A method for managing and allocating knowledge resources, the method comprising:
- monitoring a plurality of data object types as they are stored in a memory of a computing system for configuration for one or more pre-selected triggers associated with a data object type;
- identifying said one or more triggers based on comparing received data concerning a data object type with a configuration table for such data object type;
- constructing a syntax payload from data available in the data object type;
- executing said one or more triggers sequentially by sending the syntax payload via a web call to one or more universal resource identifiers (URIs) for said triggers;
- receiving a response from the trigger; and
- storing a record of the trigger response in a memory of a computing system.

6. The method of claim 5, wherein the syntax payload comprises a custom JavaScript Object Notation (JSON) string.

* * * * *